United States Patent [19]
Hoover

[11] 3,821,556
[45] June 28, 1974

[54] THREE MIRROR GLANCING INCIDENCE SYSTEM FOR X-RAY TELESCOPE

[75] Inventor: Richard B. Hoover, Huntsville, Ala.

[73] Assignee: The United States of America as represented by the Administrator of the National Aeronautics and Space Administration, Washington, D.C.

[22] Filed: Feb. 15, 1972

[21] Appl. No.: 226,477

[52] U.S. Cl. ............................. 250/505, 250/511
[51] Int. Cl. ......................................... H01j 37/26
[58] Field of Search .......... 250/51.5, 53.1, 53, 505, 250/511

[56] References Cited
UNITED STATES PATENTS
2,759,106   8/1956   Wolter ............................. 250/53.1
2,766,385   10/1956  Herrnring et al. ................. 250/53.1
2,819,404   1/1958   Herrnring et al. ................. 250/51.5

*Primary Examiner*—James W. Lawrence
*Assistant Examiner*—B. C. Anderson
*Attorney, Agent, or Firm*—George J. Porter; L. D. Wofford, Jr.; John R. Manning

[57] ABSTRACT

An X-ray telescope suitable for soft X-ray astronomical observations comprising a paraboloid section for receiving rays at a grazing angle followed immediately by a hyperboloid section which receives reflections from the paraboloid at a grazing angle and directs them to a predetermined point of focus. A second hyperboloid section is situated centrally spaced from the other two surfaces and positioned to reflect from its outer surface to the predetermined point of focus radiation from the hyperboloid which is not first reflected by the paraboloid. A shutter is included in the system to assist in calibration.

3 Claims, 1 Drawing Figure

PATENTED JUN 28 1974 3,821,556
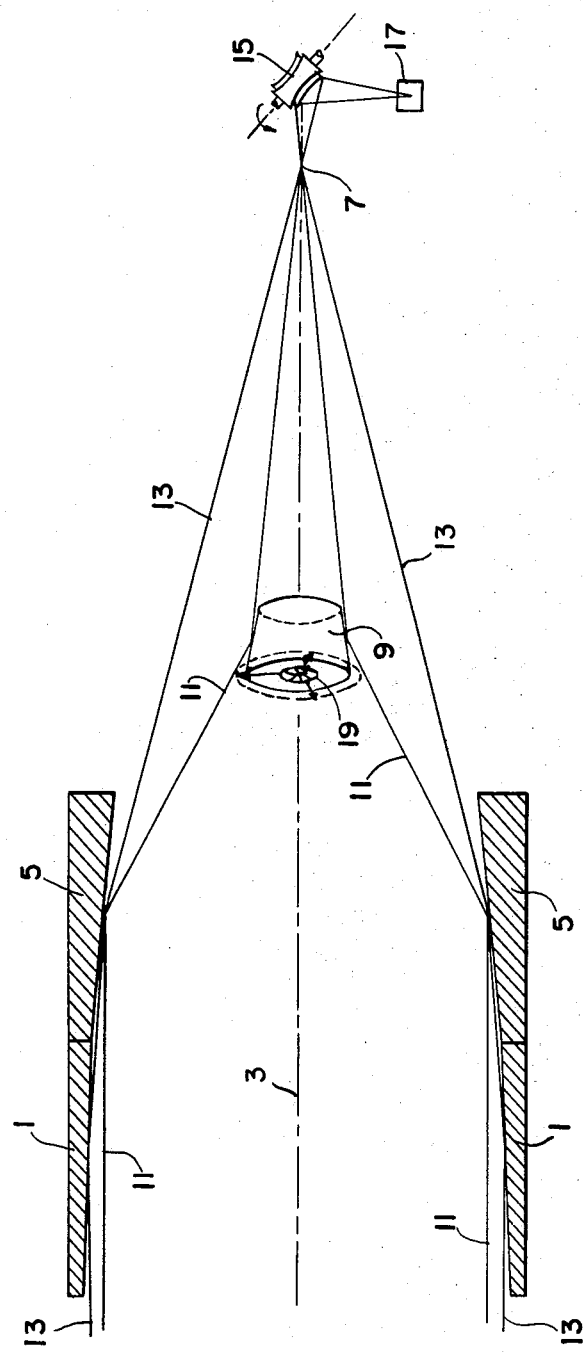

THREE MIRROR GLANCING INCIDENCE SYSTEM FOR X-RAY TELESCOPE

BACKGROUND OF THE INVENTION

The invention described herein was made by an employee of the United States Government and may be manufactured and used by or for the Government for governmental purposes without the payment of any royalties thereon or therefor.

This invention relates to optical systems and particularly to collection systems employing grazing angles, especially suited to soft X-ray telescopes. This invention provides an efficient, high resolution system for soft X-ray astronomical investigations.

In 1952, H. Wolter theoretically analyzed the optical properties of glancing incidence optical systems comprised of conic sections of revolution. The first system described was a single paraboloid of revolution. In 1960 Giacconi and Rossi proposed that telescopes composed of single paraboloid mirrors, or several paraboloid mirrors in a nested configuration, could be used to concentrate X-rays from the sun and from discrete cosmic X-ray sources. Telescopes of this type have been flown by the University College London group on rockets.

However, in his theoretical analysis of glancing incidence optical systems, Wolter showed that to obtain good imagery the X-rays must undergo an even number of reflections. It is only in this way that the Abbe sine condition can be satisfied. Systems in which the X-rays are reflected an odd number of times do not satisfy the Abbe sine condition and produce images which suffer from strong comatic aberrations.

Wolter proposed three other configurations, and they are as follows:

Type I. Two element mirror system utilizing co-axial and confocal internal paraboloid and internal hyperboloid mirrors.

Type II. Two element glancing incidence system utilizing co-axial and confocal internal paraboloid and external hyperboloid mirrors.

Type III. Two element glancing incidence system utilizing co-axial and confocal external paraboloid and internal ellipsoid mirrors.

The type III system has not as yet found application in X-ray astronomy.

In a telescope employing the type II system, the X-rays are reflected by the inner surface of the paraboloid mirror and converge toward the focal point of this element. Before they reach the focal point, they strike the outer surface of an external hyperboloid mirror and are deviated to the paraboloid-hyperboloid focus. This system has the disadvantage that the paraboloid element presents a rather small collecting area for the incident X-rays. The hyperboloid provides no collection area, but merely renders the rays with better imaging characteristics than obtainable with a single paraboloid.

Tye type I system has been used on numerous rocket flights to study solar X-ray phenomena. Telescopes of this type will also be flown in future studies, one form of which employs a nested pair of Wolter type I telescope mirrors of Kanigen coated beryllium, and another form of which employs a paraboloid-hyperboloid mirror of fused silica. In both forms front aperture stops are used to prevent X-rays from reaching the image plane without under going reflection (or from striking the surfaces at excessive angles).

X-rays which are reflected by the hyperboloid element only converge toward a hyperboloid 'pseudo focus' which lies between the mirrors and the paraboloid-hyperboloid focus. In early telescopes, these "hyperboloid-only" rays were eliminated by means of a circular stop placed at the rear of the hyperboloid element. This produced severe vignetting, a problem which was somewhat overcome by placing a small opaque disk in the hyperboloid "pseudo-focus" rather than use a large stop. More complex stop designs are possible.

Absorption of X-ray photons by stops is wasteful, but it can be tolerated in solar X-ray astronomy because the fluxes arriving from the sun are relatively high. However, in cosmic X-ray astronomy, every precious photon must be utilized if one wishes to obtain maximum efficiency in the detection of the weak celestial sources. By increasing the collecting area of the telescope, it is possible to extend its useful range for observations of weaker cosmic sources.

In one proposal, a large collection area is obtained by nesting several mirrors. If the external mirror in such a system has a diameter of approximately 1 meter, the collecting area produced is of the order of 1,000 cm$^2$, which compares with 44 cm$^2$ collecting area of the largest Wolter type I system yet built; however, since several mirrors must be nested, the mirror elements must have very thin walls, in the order of 1.25 cm each. Obviously, a glancing incidence X-ray telescope mirror with a diameter of 1 meter and a wall thickness of 1-¼ cm is, at best, a thin mirror.

Major practical problems exist in fabricating such a thin mirror so that it will maintain its figure. Indeed, the tremendous difficulty, if not impossibility, of fabricating this system is one of its major disadvantages. Another major disadvantage stems from the fact that all mirrors must be mounted and maintained in a precisely co-axial and confocal configuration. They must withstand the 1 g field on earth, the launch environment, and be properly aligned in the zero-g operational mode. Other disadvantages with this approach to obtaining a large collecting area arise from the fact that each mirror in the nest will have a different curvature of field. Hence, if on-axis rays are confocal, the off-axis rays will focus at different points along the optical axis for each mirror in the next. This can only degrade the image quality obtained for an extended object, or for point sources that are off-axis. Furthermore, the shift in focal length of each mirror, as a function of temperature, will be different. This may pose rigid thermal constraints on the system. Another major disadvantage of this approach is economic rather than scientific. Due to the size of these mirrors, and to the precision to which they must be fabricated, mounted, aligned, and maintained (mechanically as well as thermally) this telescope will be extremely costly, possibly an order of magnitude larger than the cost of proposed, alternative devices.

On the other hand, the nested telescope is capable of focusing harder x-rays than the preferred system disclosed in accordance with the instant invention.

Also known prior to this invention was a proposal to utilize the photons reflected by the hyperboloid elements in small telescopes employing the Wolter type I system, by placing a wide field detector in the hyperboloid pseudo-focus. In that design the hyperboloid acts as a "light bucket" having a large operative collecting area, but images produced have poor resolution and severe comatic aberation. The system provides a collecting area of 274.1 cm² from the paraboloid which delivers X-rays to the high resolution paraboloid-hyperboloid focus of a 53.4 cm diameter telescope. These photons are the only ones which are useful for determining precise spatial location of the source, or establishing the size and physical structure of extended objects. The hyperboloid operates at 4° glancing angle and therefore has a very large collecting area (748 cm² for this one element of only 53 cm diameter). The wide field detector in the hyperboloid pseudo-focus can be used to detect weak sources of soft X-rays and to map the soft component of the diffuse X-ray background. This could reveal the nature of the diffuse background and answer many important cosmological questions.

The major disadvantage of this system is that the resolution in the hyperboloid pseudo-focus is very poor. (The X-rays have only been reflected once.)

SUMMARY OF THE INVENTION

The design factors in accordance with this invention provide a means of obtaining a considerably larger photon flux of good imaging quality in the paraboloid-hyperboloid focus. In large telescopes, this invention makes it possible to obtain a collecting area in excess of 1,000 cm² for soft X-rays with a high resolution. The three mirror elements required can have sufficinet wall thicknesses so as to be dimensionally stable and feasible to fabricate. Devices in accordance with this invention will be considerably less costly to build, and much easier to align and maintain than the system containing a nest of several large, thin mirrors.

It is a general object of this invention to provide an X-ray telescope for investigating soft-X-rays such as those emitted by cosmic X-ray sources.

It is an object of this invention to provide an efficient high resolution optical system employing grazing angle reflection suitable for soft X-ray observations.

It is a similar object of this invention to provide an optical system which produces large photon concentration with high resolution focus.

It is a more specific object of this invention to provide a paraboloid-followed-by-hyperboloid system of high optical quality which takes full advantage of the large photon flux reflected by the hyperboloid.

It is another object of this invention to provide an optical system particularly useful for studying relatively weak, cosmic X-ray sources.

It is another object of this invention to provide an optical system which is practical and relatively inexpensive.

It is another, more specific object of this invention to provide an otpical system which may be conveniently calibrated by means of a shutter.

In accordance with this invention, a three-reflector optical system is provided comprising an internally reflective paraboloid, followed by an internally reflective hyperboloid one sheet, followed by an aspheric element, more specifically, an element having the general form of one part of an externally reflective hyperboloid of two sheets. The paraboloid and first hyperboloid are confocal in that they share the same focus location. The first two elements may be contiguous and meet at their boundary without substantial discontinuity. The third, hyperboloidal element may be spaced from the first two elements and on a common axis with them. It is located between the hyperboloid element and the pseudo focus, where grazing reflections directly from said second surface are directed, and has its distal focus at the same location as that of the paraboloid-hyperboloid reflective combination.

These and other objects, features, characteristics and advantages will be apparent from the following description of the preferred embodiment of this invention, as illustrated by the accompanying drawing.

BRIEF DESCRIPTION OF THE DRAWING

The drawing illustrates the optical system in accordance with this invention and suggests certain major conventional elements of the telescope in which the optical system is utilized.

DESCRIPTION OF THE PREFERRED EMBODIMENT

The preferred embodiment comprises a first paraboloid of revolution 1, centered on a hypothetical optical axis 3. The internal, reflective surface of the paraboloid 1 presents a glancing or grazing angle to radiation parallel to the axis 3, characteristic of radiation of an infinite or very distant source such as a star.

Immediately next to paraboloid 1 is hyperboloid 5, which is a section of a hyperboloid of revolution in one sheet. Hyperboloid 5 is also centered on axis 3 and has a common boundary with paraboloid 1 where paraboloid 1 and hyperboloid 5 meet. The focus of paraboloid 1 and the distant focus of hyperboloid 5 are located at substantially the same location. The proximate focus of hyperboloid 5 is located at the point 7, which is the focus point of the telescope of this preferred embodiment.

Spaced longitudinally toward the focus 5 and also centered on axis 3 is the third mirror element 9, of the general shape of a section of one part of a hyperboloid of revolution in two sheets. By preference of theoretical considerations, mirror 9 is not precisely a hyperboloid, but is hyperboloidal in general configuration based upon the following design factors and considerations:

Precise focusing by reflection from a hyperboloid to its distant focus assumes that the incoming radiation is focused on the proximate focus of the reflecting hyperboloid surface. This is not precisely the case with regard to rays parallel to axis 3 reflected only from surface 5 and then by element 9, but is closely approximated. A modified or deformed surface configuration of element 9 is determined to provide exact focusing of all such radiation to the point 7. Actual computation may be a matter of conventional, essentially straightforward mathematical computation using electronic data processing techniques and the successive approximation approach. A precise hyperboloid is selected by theoretical considerations based upon the physical shape desired and the criterion that constant optical path length is desired to minimize optical aberrations. The equation $y = Ax^2 + Bx^4 + Cx^6 + \ldots + Nx^n$ is solved for the high order constants or coefficients A, B, and C, termed coefficients of deformation, with more of the coefficients determined if physical fabrication of the reflecting element is to be of corresponding accuracy. The final equation with the coefficients of deformation determined defines the hyperboloidal shape of the final design.

Element 9 is of length sufficient to intersect substantially all radiation parallel to the optical axis which first intersects only hyperboloid 5, illustrated by rays 11 in the drawing. Such parallel radiation which intersects paraboloid 1 and then hyperboloid 5 is illustrated in the drawing as rays 13.

Shown in general outline to provide an indication of the major features of the telescope, is a bent crystal spectrometer 15 located past focus point 7 and positioned to receive radiation converged at the point 7. Spectrometer 15 directs the radiation to a detector 17, which may be any of the conventional detectors such as proportional counters, image intensifiers, and photographic films for solar work.

A shutter 19, in the form of an expandable iris diaphragm, is located immediately in front of the hyperboloid 9. Shutter 19 is expanded, as shown in dotted outline, to block the reflections from hyperboloid 5 to hyperboloid 9 and thereby permit calibration of the telescope based upon the paraboloidhyperboloid reflections. Shutter 19 could also be extended to eliminate hyperboloid 9 from the operative system should it become damaged or misaligned.

Although it will be clear that an unlimited number of designs are possible based upon this invention, since the reflective shapes theoretically need not be limited in size, structural and economic factors do impose practical constraints.

The reflective section of the paraboloid 1 initiates 90 inches from focus point 7, as measured along axis 3. It is 19.685 inches long as measured along axis 3, and presents a collecting area of 274.1 square centimeters to incoming radiation.

Hyperboloid 5 is also 19.685 inches long as measured along axis 3. Hyperboloid 5 presents a collecting area of 748 square centimeters to incoming radiation.

Hyperboloid 9 is spaced along axis 3 from hyperboloid 5 and entirely located in the area more than half the distance from focus 7 to hyperboloid 5.

The operation of the device is, of course, essentially automatic since reflection occurs according to natural laws without human intervention. The telescope is adjusted in position or trained in some manner so that axix 3 is pointed directly toward the distant source under observation. All light from the distant source is then essentially parallel to axis 3.

Assuming perfect dimensions and positioning, all reflections from paraboloid 1 to hyperboloid 5 are precisely focused to the point 7. Reflections from surface 5 to hyperboloid 9 are focused to point 7 with a degree of accuracy corresponding to the precision of the design and fabrication of the element 9. Where, for economic or other reasons, element 9 is a true hyperboloid, precise focusing is still closely approximated.

The surface sections employed in the design present grazing angle reflective surfaces, thereby providing a system in which the inherent limitations of high angle reflections of X-rays are avoided.

The surfaces of the preferred embodiment are surfaces of revolution, providing symmetry around the optical axis 3. Clearly, the symmetrical nature of this embodiment simplifies construction and design. It would be possible, however, directly within the basic approach of this invention to employ surfaces not symmetrical around axis 3. Thus, so long as the paraboloid surface and the following hyperboloid of one sheet surface at each different angle around the axis 3 share the same focal point, with the proximate focus as discussed, proper focusing would occur. The external configuration of the third, central element 9 would be adjusted accordingly at the different angles around axis 3 so that horizontal radiation reflected only by the hyperboloid of one sheet surface at the corresponding angle would be reflected to the point of focus. But such unsymmetrical designs, although theoretically possible, will generally be highly impractical and expensive to fabricate, and fabrication of such designs might well exceed the present state of the art in many instances.

Other variations of the invention described will be apparent, and variations may well be developed which employ more than ordinary skill in this art, but nevertheless employ the basic contribution and elements of this invention. Accordingly, patent protection should not be essentially limited by the preferred embodiments discussed, but should be as provided by law, with particular reference to the accompanying claims.

I claim:

1. An optical system adapted to employ grazing angle reflections to focus X-ray radiation comprising:
   a first surface comprising an internally facing, concave, reflective surface in the form of a paraboloid of revolution;
   a second surface contiguous to said first surface, both said surfaces having a common longitudinal axis, a common distant focus, and the same diameter at their boundary regions, said second surface comprising an internally-facing, concave, reflective surface in the form of a hyperboloid of revolution, positioned to receive grazing angle reflections from said first surface at grazing angles and to reflect said reflections from said first surface to said distant focus; and
   a third surface spaced from said second surface toward said distant focus, said third surface having both a longitudinal axis and a distant focus which are common with said first and second surfaces, said third surface comprising an externally facing, convex, reflective surface in the form of a deformed hyperboloid of revolution, positioned to receive at grazing angles radiation reflected from said second surface from a path parallel to said longitudinal axis and reflect said radiation from said second surface to said distant focus.

2. The optical system of claim 1 comprising a shutter positioned immediately in front of said third surface and expandable to block said radiation from said second surface to said third surface.

3. The optical system of claim 2 wherein said third surface is located within the area more than half the distance from said distant focus to the nearest point on said second surface.

* * * * *